June 5, 1923.

R. J. C. TAMPIER

OPERATING HANDLE FOR CONTROL OR OTHER MECHANISM

Filed March 23, 1921

1,458,013

INVENTOR
René Jean Camille Tampier
BY
ATTORNEY

Patented June 5, 1923.

1,458,013

UNITED STATES PATENT OFFICE.

RENÉ JEAN CAMILLE TAMPIER, OF BOULOGNE-SUR-SEINE, FRANCE.

OPERATING HANDLE FOR CONTROL OR OTHER MECHANISM.

Application filed March 23, 1921. Serial No. 454,923.

*To all whom it may concern:*

Be it known that I, RENÉ JEAN CAMILLE TAMPIER, citizen of the Republic of France, and resident of Boulogne-sur-Seine, France (post-office address 1 Rue de Bellevue), have invented a new and useful Improvement in or Relating to Operating Handles for Control or other Mechanism (for which I have filed applications in France, May 4, 1918, Patent No. 497,379, and England, November 13, 1919, Patent No. 126,615), which improvements are fully set forth in the following specification.

This invention consists substantially in providing in the path of a handle, a stop adjustable by hand and limiting its travel, and providing means for rendering the stop inoperative at will.

Figure 1:
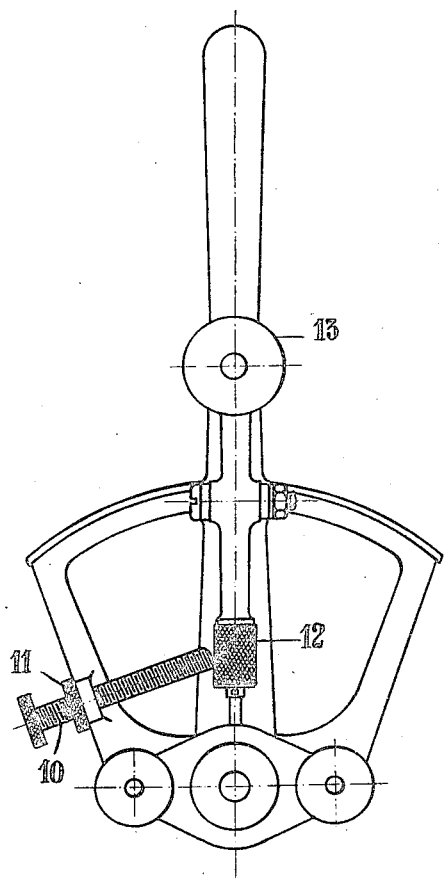
Figure 2:
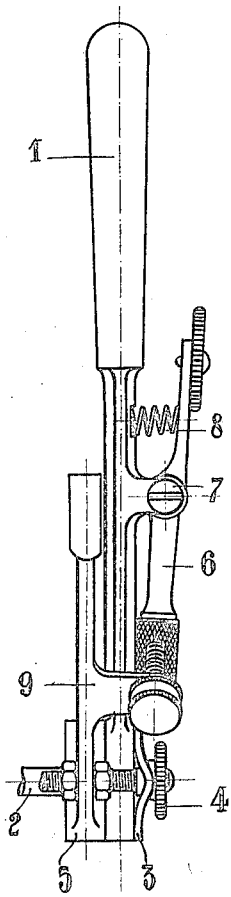

A construction of the handle according to the invention is shown in front and in side elevation in Figures 1 and 2.

1 is the main handle rotating about a fixed pin 2, and pressed by a spring washer 3 and nut 4 against the fixed hub 5 of a quadrant. The main handle carries a second handle 6 fulcrumed on a pin 7 and held away from the main handle by a spring 8, the said handle 6 participating in the rotation of the main handle. A boss 9 on the fixed quadrant carries a set-screw 10 provided with a lock-nut 11. This screw abuts on a roller 12 of a softer metal than that of the screw and arranged at the lower part of the small handle 6 which is operated by means of the button 13.

The working of the handle is as follows: When the position of the screw 10 has been adjusted, if the handle 1 is operated in the ordinary way, the part 12 of the small handle or lever, which participates in the movement of the main handle, will strike the set-screw 10. If at this instant a further movement of the main handle is desired, the button 13 is pressed, whereupon the handle 6 swings out of the path of the screw 10, and the roller 12 rolls on the screw. When the main handle is pushed back, the small handle 6 will automatically return to its normal position for arresting the screw on the next movement of the handle.

Having now particularly described and ascertained the nature of my said invention and in what manner the same is to be performed, I declare that what I claim is:—

1. The combination of a support, a swinging handle pivoted thereon, a stop carried by the support and adjustable to vary its position with relation to the handle, and a member carried by the handle for engagement with the stop during the movement of the handle in one direction, to limit said movement; said stop and member constituting companion parts, one of which is movable to a position to avoid such engagement and thereby permit the handle to swing beyond the stop.

2. The combination of a support, a swinging handle pivoted thereon, a stop having a threaded connection with said support to adjust the position of its free end with relation to the handle, and a member carried by the handle for engagement with said stop end during the movement of the handle in one direction; said member being movable to a position to avoid such engagement and thereby permit the handle to swing beyond the stop.

3. The combination of a support, a swinging handle pivoted thereon, a threaded stop screw carried by said support and adjustable to vary the position of its free end with relation to the handle, and a lever pivotally mounted on the handle and having one arm disposed in line with said screw to strike against the same when the handle is moved in one direction; said lever being operable to move its said arm out of line with the screw so as to avoid striking thereagainst, thereby to extend the range of movement of the handle.

4. The combination of a swinging lever, a stop, and a member carried by the handle to engage the stop when the handle is moved in one direction and thus limit the extent of such movement; said stop and member constituting companion parts, one of which is movable at will to a position to avoid such engagement and thereby permit the handle to be swung beyond the stop, one of said companion parts being adjustable with relation to the other to vary the normal distance between them.

5. The combination of a handle, a stop, a roller carried by the handle, means for adjusting said roller to be arrested by the stop or to roll past the same during the movement of the lever in one direction, and means for returning the roller automatically to its initial position when the handle is restored to its normal position.

In testimony whereof I have signed this specification in the presence of two subscribing witnesses.

JEAN RENÉ CAMILLE TAMPIER.

Witnesses:
FERNAND DUFOUR,
CHARLES LÉON LOISEL.